July 27, 1954  H. GANG  2,684,809
OPERATION CONTROL MEANS
Filed Jan. 10, 1952  4 Sheets-Sheet 4

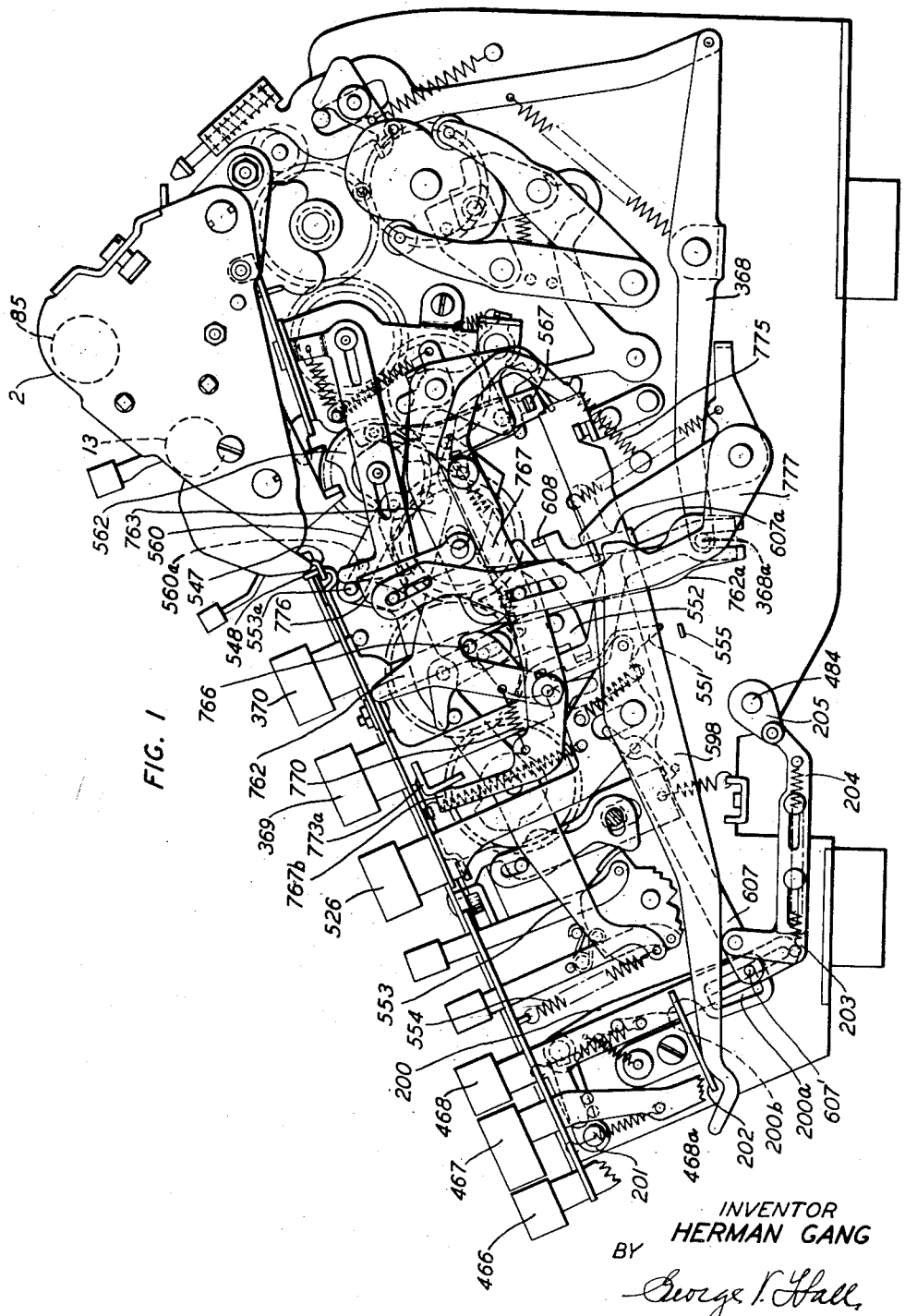

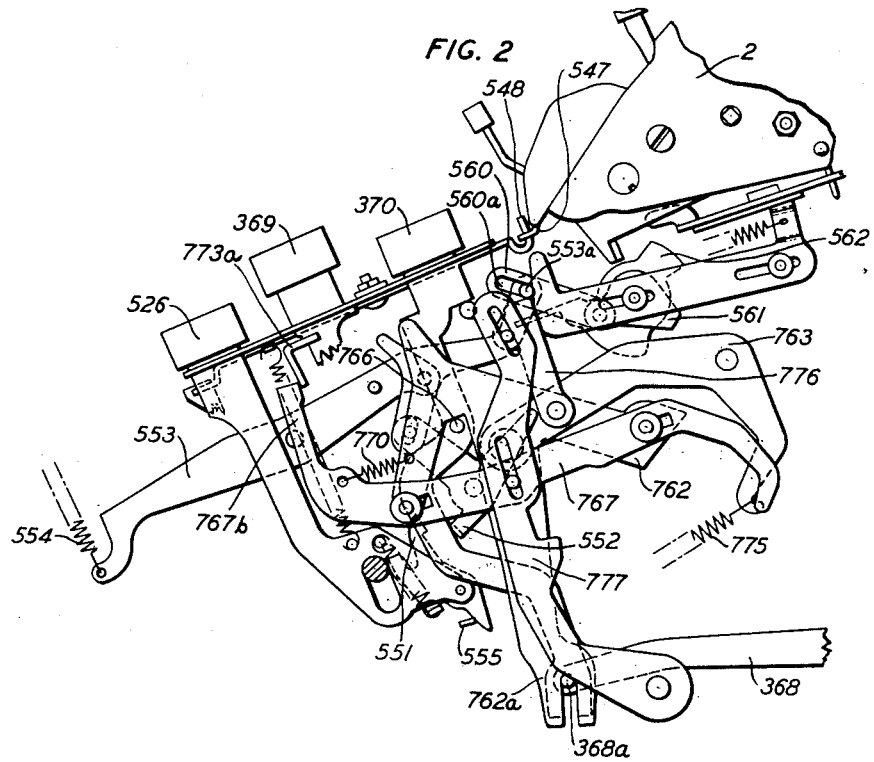

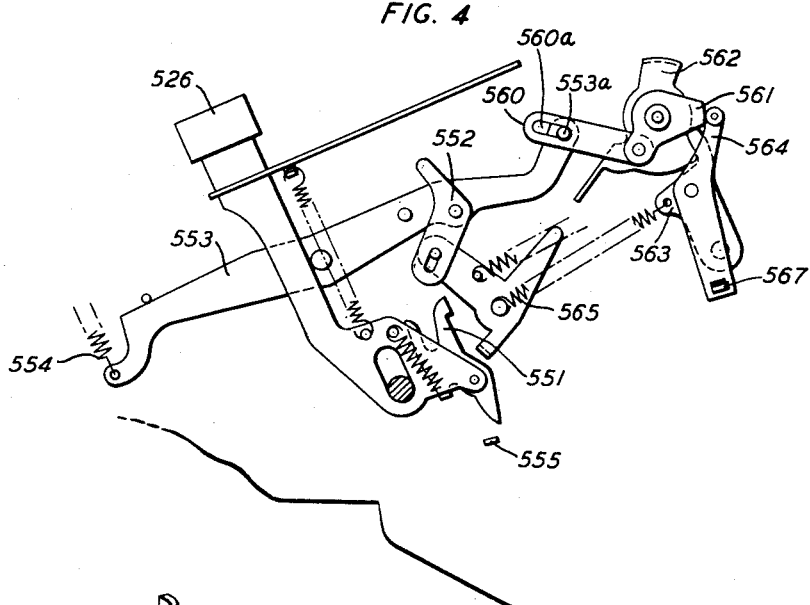
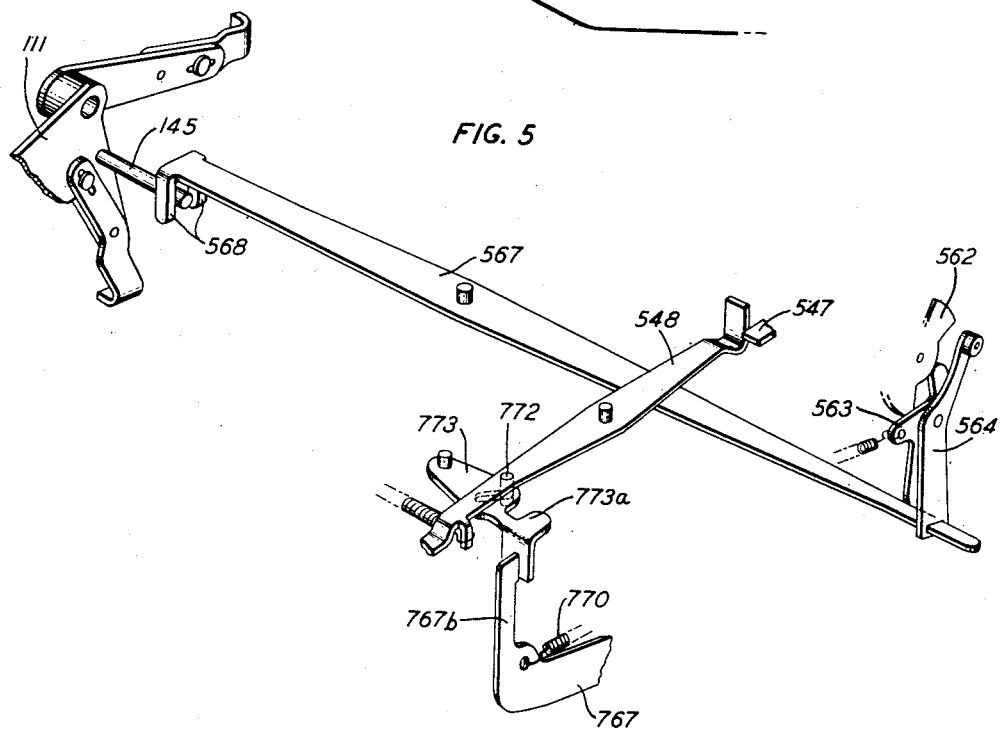

INVENTOR
HERMAN GANG
BY
George V. Hall
ATTORNEY

Patented July 27, 1954

2,684,809

UNITED STATES PATENT OFFICE 2,684,809

OPERATION CONTROL MEANS

Herman Gang, Livingston, N. J., assignor to Monroe Calculating Machine Company, Orange, N. J., a corporation of Delaware Application January 10, 1952, Serial No. 265,789

6 Claims. (Cl. 235—60.47)

The invention relates to operation control means for calculating machines, and more particularly to improved means for effecting the operations of mechanisms disclosed in applicant's Patents #2,572,920 and #2,531,206.

According to the disclosure of Patent #2,572,920, the position of a shiftable register carriage selectively determines the sequential operation of a plurality of clutch driven mechanisms, or alternatively the individual operation of one of the mechanisms in response to the movement of an operating member such as a key. If the carriage is in a given position where it is necessary for the institution of a program of multiplication as disclosed in applicant's Patent #2,531,207, depression of a multiplier setup key releases spring energized mechanism which initiates a multiplier entering operation which is performed by mechanism adapted also to perform a dividend entering operation. If, however, the carriage is displaced from the given position, the spring energized mechanism will be released upon depression of the setup key; but its operation will be held in abeyance until the conclusion of a left carriage shift in the given position. The carriage shift is initiated by devices directly operable by depression of the setup key and this lends to relatively high resistance to key depression. The present invention utilizes the above referred to spring energized mechanism to initiate by direct operation both the carriage shifting and multiplier entering operations. Therefore, equal ease of setup key depression is achieved regardless of the position of the carriage for the reason that the only function of the key is to release the spring energized mechanism.

In accordance with the disclosure of the aforenoted Patent #2,531,206, the spring energized mechanism, in addition to initiating the multiplier entering operation, may be released by a second setup key to initiate a dividend entering operation. The arrangement is such that simultaneous depression of a clear key with the setup key will initiate a clutch driven register clearing operation, which operation will initiate a right carriage shift to a given position in which the dividend will be properly aligned with the divisor. The operation of the released spring energized mechanism to initiate the dividend entering operation is held in abeyance, by a blocking member positioned by depression of the setup key, until termination of the carriage shift in the given position. If the carriage is in its rightmost position, the operation of the clearout clutch will be ineffective to engage the carriage shift mechanism, and the clearout and dividend entering operations will be effected seriatim. The present invention utilizes the clearout clutch operation to release the spring energized mechanism and also to position the blocking member. This substantially reduces resistance to setup key depression. The invention provides means to disable the spring energized mechanism for the left shift initiating operation when it is released for a dividend entering operation which, as heretofore noted, may be effected in conjunction with a right carriage shift.

The foregoing outlined operations are only illustrative of specific applications of the invention. In its broad aspects, the invention is particularly adaptable to calculating machines wherein it is necessary or desirable to institute a particular clutch driven operation with the shiftable carriage in a given position. It will be readily understood, therefore, that the invention resides in the control of the initiation of clutch driven operations in conjunction with carriage position devices and that the particular operation initiated has no relation to the invention per se. The invention, however, will best be understood from the following description with reference to the accompanying drawings in which reference numerals applied to various parts are the same as those applied to similar parts in the patents referred to herein.

Fig. 1 is a right side view of a calculating machine showing the control devices in normal position as associated with the multiplier-dividend setup and carriage shift initiating mechanisms.

Fig. 2 is a fragmentary right side view illustrating a portion of the control devices shown in Fig. 1 in an operated position.

Fig. 3 is a fragmentary right side view illustrating another portion of the control devices shown in Fig. 1 in an operated position.

Fig. 4 is a fragmentary right side view more clearly illustrating the multiplier-dividend setup initiating mechanism shown in Fig. 1 and in an operated position.

Fig. 5 is a fragmentary perspective of portions of the control devices, adjusting means therefor and portions of the main clutch engaging mechanisms.

The main clutch mechanism

Figure 7:
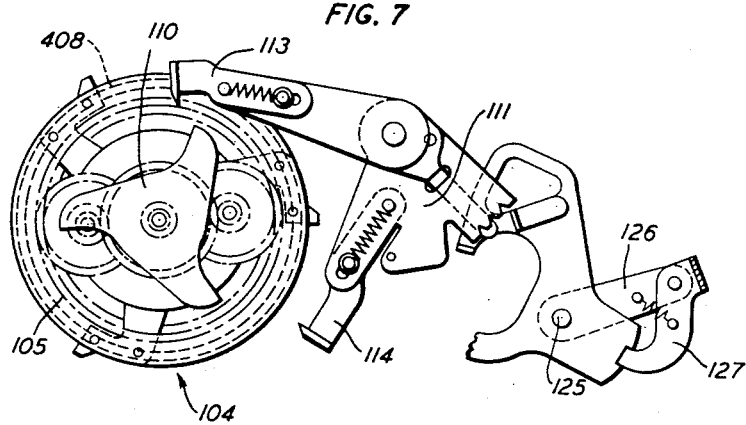
Fig. 7 is a detailed elevation of the main differential clutch mechanism and control means therefor.

The devices of the invention are herein disclosed as operable in connection with the control of a main differentially operable clutch mechanism 104 (Fig. 7) which is adapted to drive the multiplier-dividend setup mechanism or, alternatively, the carriage shifting mechanism.

The differential clutch mechanism 104 (Fig. 7), driven by a motor (not shown), is constructed substantially in accordance with the disclosure of Patent #1,566,650 issued to George C. Chase. Normally the gearing comprising both working legs of the differential drive rotate idly and no drive will be transmitted to output gear 408. The working legs of the differential drive are selectively arrested by means of a reversing clutch lever 111 fulcrumed on the machine frame, and adapted for neutral, additive and subtractive setting. Clockwise movement of lever 111 positions it to additive setting whereby a hook arm 114 of said lever will engage a lug upon gear 105 which forms one leg of the differential drive to interrupt its movement, thereby causing rotation of output gear 408. Conversely, counterclockwise movement will position the lever to subtractive setting, whereby a hook arm 113 thereof will engage a stop 110 of the other arm of the differential to interrupt its movement and cause rotation of output gear 408 in the reverse direction.

Initiation of multiplier and dividend setup operation

According to the disclosure of applicant's Patent #2,531,206, the spring energized mechanism will initiate operation of setup mechanism to enter selected values into a series of multiplier storage dials only with the register carriage 2 (Fig. 1) in its leftmost position. Alternatively, the spring energized mechanism will initiate operation of the setup mechanism to enter selected values into a product dividend register only with the carriage displaced from its leftmost position.

The spring energized mechanism operates to adjust the setup mechanism for operation and engages the main clutch mechanism 104 (Fig. 7) for additive drive. The setup operations are effected by drive to the differentially settable actuators (not shown) of the machine from output gear 408 of the main clutch mechanism through a normally engaged friction clutch (not shown) as fully disclosed in the aforenoted Patent #2,531,206.

As heretofore noted, the invention does not concern the particular clutch driven operations effected, but relates to control of the engagement of the clutch mechanism to drive the mechanism which performs the operation. In the present instance, therefore, it is considered only necessary to describe the operation of the spring energized mechanism to engage clutch mechanism 104. Reference is made to the aforenoted Patent #2,531,206 for the operation of the setup mechanism upon engagement of clutch 104, and for the means whereby the position of carriage 2 selectively determines a multiplier or dividend entering operation.

The spring energized mechanism includes a lever 553 (Figs. 1, 2 and 4) which normally is held counterclockwise by a toggle 552 against the tension of a relatively strong spring 554. Toggle 552 is broken to release lever 553 by means hereinafter described in connection with the devices of the invention. A pin 553a projecting outwardly from the right end of lever 553 engages the forward end of a slot 560a at one end of a link 560, the opposite end of which is pivotally attached at a common point to a pair of cams 561 and 562. When toggle 552 is broken (Fig. 4), lever 553 will be spring driven in clockwise direction, thereby moving pin 553a to the rear end of slot 560a. Lever 553 is then driven further until checked by a suitable stop and cams 561 and 562 will, therefore, be rotated counterclockwise by link 560. It may be noted at this point that lever 553 is afforded idle movement as pin 553a is moved from one end of slot 560a to the other, and as hereinafter described, this idle movement is utilized in connection with the operation of the devices of the invention.

Cams 561 and 562 are adapted for operation in connection with an arm 563 (Figs. 4 and 5) pivotally mounted at its lower end on the machine frame, and a lever 564 pivotally mounted intermediate its ends on arm 563. The upper free end of arm 563 terminates in a nose which is held against cam 562 by a spring 565 which urges the arm counterclockwise. Lever 564 has, at its upper end, a roller which is normally in contact with cam 561. Upon counterclockwise movement of cam 562, arm 563 will not be moved from its normal position, as the movement of cam 562 is not sufficient to bring the effective portion thereof into contact with the nose of said arm. The pivotal point of lever 564 on arm 563 will, therefore, at this time be maintained in fixed position. However, in the performance of the setup operation, arm 563 will be rocked upon further movement of cam 562, which movement is effected following the initiation of the operation as disclosed in the aforenoted Patent #2,531,206, which operation does not concern the present disclosure. Upon initial counterclockwise movement of cam 561, however, lever 564 will be rocked clockwise, from an intermediate position to the position shown in Fig. 4, to move clutch lever 111 (Figs. 4 and 7) to its additive position, thereby engaging main clutch mechanism 104 for the setup operation as follows:

Lever 564 has, at its lower end, a slot through which extends one end of a lever 567 (Figs. 4 and 5). Lever 567 extends across the machine and has at its other end a pair of spaced ears 568. Ears 568 are normally positioned out of contact with and at opposite sides of a pin 145 on clutch lever 111, and are sufficiently spaced to allow the clutch lever to be moved, in other machine operations, to either of its active positions without interference. However, upon clockwise movement of lever 564, lever 567 will be rocked clockwise a sufficient distance to engage an ear 568 with pin 145, thereby moving clutch lever 111 to additive setting and thus engage the drive for the setup operation.

Carriage shifting mechanism

The carriage shifting mechanism is constructed and operates substantially in accordance with the disclosure of applicant's Patent #2,531,206.

The selectively engageable main clutch mechanism 104 (Fig. 7), which, as heretofore described, determines the sign of registration, is alternatively engageable to determine the direction of the shift of register carriage 2. Clutch lever 111 is selectively moved to its respective clutch engaging positions upon depression of a plus registration key 120 (Fig. 6) or a minus registration key 121 by a shaft 125 through a connecting train which includes an adjustable coupling 126—127 (Fig. 7) to permit disengagement of the clutch mechanism while a registration key is held depressed.

Figure 6:
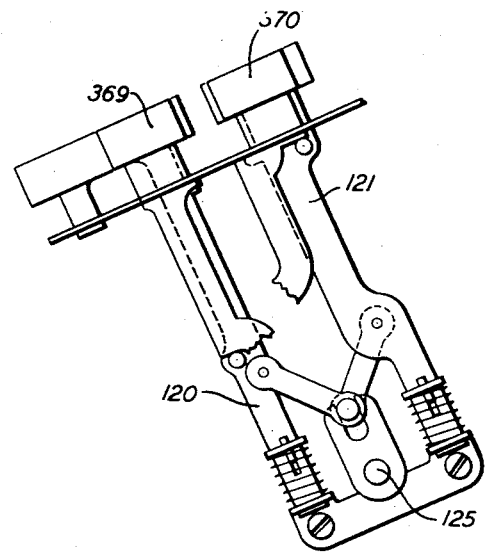
Fig. 6 is a fragmentary side view of the right and left carriage shift keys as associated with the plus and minus registration keys.

Associated with plus key 120 and minus key 121 are the right and left shift keys 369 and 370 respectively (Figs. 1, 2 and 6). The stems of the right and left shift keys are provided with shoulders which overlie pins in the stems of the plus and minus keys respectively, whereby depression of a shift key results in the depression of the associated registration key to selectively engage the main clutch mechanism 104. Furthermore, the stems of the shift keys each have at their lower ends an open end slot engaging a pin 368a at the leftmost end of a lever 368. Therefore, upon depression of a shift key, lever 368 is rocked and means are provided which, in response to this movement, operates to disengage the aforenoted normally engaged friction clutch for the registering operations and engages another normally disengaged friction clutch which completes the drive from the main clutch mechanism 104 to the shifting mechanism. Additive engagement of clutch mechanism 104 upon depression of plus key 120 by shift key 369 connects the shifting mechanism for right shift of the carriage, and, conversely, depression of minus key 121 by shift key 370 connects the shifting mechanism for left shift.

The carriage will be continuously shifted until the depressed shift key is released, or until the carriage is shifted into one or the other of its extreme denominational end positions, whereupon means will be operated to terminate operation of the shifting mechanism with the key depressed. Also, tabulating keys may be provided to enable means for terminating the shift in selected intermediate denominational positions with a shift key held depressed.

The devices of the invention are operable in connection with the shift initiating operations and with operations incidental to termination of the shifting operations. Subsequent to the initiation of a shifting operation, the devices of the invention have no control of the shifting mechanism other than to hold a shift key depressed, nor control of the operation of the shift terminating means. Reference, therefore, is made to the aforenoted Patent #2,531,206 for the details of operation of the shift and shift terminating mechanisms.

*Carriage position control means (multiplier entering)*

The setup key 526 (Figs. 1, 2 and 4) is operable to break toggle 552 and thereby release spring energized lever 553. The lower end of key 526 has a trip member 551 pivotally mounted thereon. The trip member is normally spring biased clockwise and has an upstanding hook portion which is normally positioned above a leftward extension of the lower link of toggle 552, said link being pivotally mounted at its lower end to the machine frame. The upper link of toggle 552 is pivoted at its upper end to the right arm of lever 553. Thus, when toggle 552 is set, lever 553 is held in normal counterclockwise position against the tension of spring 554.

Upon depression of key 526, the hook portion of member 551 will be brought downwardly into contact with the leftward extension of the lower link of toggle 552, thereby rocking the link and breaking the toggle to release spring urged lever 553. As trip member 551 is moved downwardly to break the toggle, a cam edge of a lower extension of the trip member will contact a lug 555 (Figs. 2 and 4) on the machine frame to rock said trip member counterclockwise against the tension of its spring. Trip member 551 is thus removed from the path of movement of the leftward extension of the lower link of toggle 552, so that said toggle may be reset should key 526 be held depressed as disclosed in the aforesaid Patent #2,531,206.

The carriage position control means comprises an adjustable device which, if carriage 2 is in its leftmost position, will be adjusted to a disabled position. Depression of key 526 and the attendant release of lever 553 will then result in the immediate operation of the setup mechanism to perform a multiplier entering operation, as described under the heading "Initiation of multiplier and dividend setup operation." If, however, the carriage is out of its leftmost position, the control device will be so adjusted that it will be operated by lever 553 to depress left shift key 370. Depressed shift key 370 through the device will block lever 553 from its full extent of movement. That is, the movement afforded lever 553 at this time will not initiate operation of the setup devices. However, upon movement of carriage 2 into its leftmost position, the device will be adjusted from blocking position and spring urged lever 553 will complete its excursion to initiate operation of the setup devices.

The control device includes a member 762 (Figs. 1 and 2) which has pivotal mounting intermediate its ends at the end of a leftwardly extending arm of a bell crank 763 which is fulcrumed on the machine side frame. Member 762 overlies and engages a pin 766 on the stem of left shift key 370, and has a depending leg 762a which has an open end slot at its lower end engaging pin 368a, which, as heretofore noted, is also engaged by the ends of the shift keys. Leg 762a, therefore, holds member 762 in proper operating relation with the stem of shift key 370. An adjustable slide 767 has slot and pin mounting adjacent either end on member 762 and has an upstanding finger 767b which is adapted for engagement with a depending lug 773a (Fig. 5) at the free end of an arm 773 which is pivotally mounted on the underside of the key plate. Slide 767 is urged to the right by a spring 770, thereby holding finger 767b into engagement with lug 773a. An arm 776 is pivotally mounted at its lower end on the leftwardly extending arm of bell crank 763 with its upper free end positioned beneath pin 553a of lever 553 when the carriage is out of its leftmost position. Arm 776 is held in upright position by slot and pin connection, adjacent its upper end, with the upper free end of an arm 777 which is pivotally mounted at its lower end on the machine frame and which, intermediate its ends, has slot and pin connection with slide 767. Bell crank 763 is normally held in clockwise position (Fig. 1) by a relatively weak spring 775. Thus, normally, member 762, slide 767 and arm 776 will be held in raised position, the slot and pin connections of arm 776 and slide 767 with arm 777 permitting the parts to be raised and lowered.

When carriage 2 is in its leftmost position, a lug 547 (Figs. 1, 2 and 5) at the right end of the carriage will engage the right end of a lever 548, which is pivotally mounted on the underside of the key plate, and rock the lever counterclockwise against the tension of a spring which urges it in the opposite direction. A depending pin 772, adjacent the left end of lever 548, engages a cam slot intermediate the ends of arm 773. Therefore, upon counterclockwise movement of lever 548, pin 772 will move arm 773 clockwise and lug 773a engaging finger 767b will move slide 767 to the left against the tension of spring 770. Upon leftward movement of slide 767, its slot and pin connection with arm 777 will rock said arm counterclockwise, and the slot and pin connection at the upper end of the arm will be effective to rock arm 776 in like direction to move its upper end from the position shown in Fig. 1 to a position to the left of pin 553a of spring energized lever 553. The control device will thus be disabled. Therefore, when lever 553 is released upon depression of key 526, pin 553a will pass to the right of arm 776 and the multiplier entering operation will be initiated forthwith as heretofore described.

When carriage 2 is positioned to the right of its leftmost position, lug 547 will be removed from engagement with lever 548 which will be spring moved clockwise, thereby moving arm 773 counterclockwise to release slide 767. Spring 770 will then move slide 767 to the right and arm 777 connected thereto will rock arm 776 clockwise to position its upper end beneath pin 553a of lever 553 as shown in Fig. 1. Upon depression of key 526 and the consequent release of spring energized lever 553, pin 553a, engaging the upper end of arm 776, will move the arm and the connected parts downwardly and crank 763 counterclockwise against the tension of the relatively weak spring 775. In its downward movement, member 762 engaging pin 766 will depress shift key 370 as shown in Fig. 2 to initiate a left carriage shifting operation. Shift key 370 will be fully depressed and lever 553, therefore, will be restrained from further movement by pin 553a engaging the end of arm 776. Furthermore, the movement of lever 553 at this time will be only sufficient to move pin 553a from the outer to the inner end of slot 560a of link 560. Therefore, no movement will be imparted to cam 561, lever 564 and lever 567 to initiate operation of the setup mechanism. The carriage will be continuously shifted until the operation is terminated in the leftmost position. Upon movement of the carriage into the leftmost position, the control devices will be adjusted as heretofore described, thereby moving the upper end of arm 776 from engagement with pin 553a of spring energized lever 553. Lever 553 will, therefore, be released to complete its full extent of movement, and thereupon the multiplier entering operation will be initiated. Furthermore, upon movement of arm 776 from engagement with pin 553a, spring 775 will rock bell crank 763 clockwise, thereby restoring the control devices to normal and releasing depressed shift key 370.

*Carriage position control means (dividend entering)*

The register clearing operations, fully disclosed in applicant's Patent #2,531,206, are selectively effected upon engagement of a single cycle auxiliary clear clutch (not shown). The clutch is engaged to clear the product-dividend dials 13 (Fig. 1) upon depression of a clear key 467, and upon depression of an adjacently positioned clear key (not shown), the clutch is engaged to clear the multiplier quotient dials 85. The clear keys may be depressed conjointly, and thus the clearing operations effected simultaneously. As an incident to the operation of the clear clutch, shaft 484 is rocked counterclockwise from the position shown in Fig. 1 to the position shown in Fig. 3 and returned. These operations, performed in like manner, are utilized in conjunction with the devices of the present invention, and accordingly, reference is made to said patent for the details of these operations.

Furthermore, according to said Patent #2,531,206, after adjustment of certain mechanisms in connection with a program of division, conjoint depression of a setup key 468 with clear key 467 and/or the other register clear key will be operable, if carriage 2 is out of its rightmost position, to cause engagement of the carriage shift mechanism for right shift, and to release spring energized lever 553. Operation of the setup mechanism, however, will be held in abeyance until termination of the carriage shift. Setup key 468 (Figs. 1 and 3), through direct connection, is depressible to rock a lever 607 counterclockwise. Upon counterclockwise movement of lever 607, an upstanding arm 608 thereof will engage the lower link of toggle 552 to break the toggle and thereby release spring energized lever 553. However, a blocking lever 598 will have been moved counterclockwise by a lug 607a of lever 607 to position its right end to block movement of main clutch engaging lever 567, and thereby hold the operation of the spring energized mechanism in abeyance. Furthermore, the movement of lever 598 will condition the mechanism which, upon concurrent operation of the clearout clutch, will cause depression of the right shift key 369. Upon termination of the right carriage shift, the blocking lever will be removed, thereby releasing the spring energized mechanism to initiate the dividend entering operation. The present invention utilizes the movement of shaft 484, consequent to operation of the clear clutch, to rock levers 607 and 598 instead of by direct connection with key 468. Otherwise, the above operations are performed as disclosed in the aforesaid Patent #2,531,206.

According to the present invention, lever 607 has a pin 607' (Figs. 1 and 3) at its leftmost end. Pin 607' intermediately engages a slot at the lower end of the stem of setup key 468 and also engages the lower edge of a rectangular opening 200a at the lower end of a latch arm 200. Latch arm 200 is pivotally mounted at its upper end to the end of an arm 201, the opposite end of which is fulcrumed on the machine frame. Latch arm 200 is spring biased counterclockwise, thereby normally engaging a shoulder 200b thereof with the rear edge of a plate 202. Latch arm 200 normally is held against downward movement by its shoulder 200b engaging plate 202, and pin 607' engaging the lower edge of opening 200a will therefore restrain lever 607 from counterclockwise movement.

A link 203 has pivotal attachment at its left end with lever 607 a slight distance to the rear of pin 607'. A second link 204 has pin and slot connection with link 203 and the two links are normally spring urged together lengthwise to the limit of the slot and pin connection. The right end of link 204 has pivotal connection with a crank 205 fixed on shaft 484. Therefore, upon individual depression of a clear key and the consequent counterclockwise movement of crank 205, the spring connection between links 203—204 will yield for the reason that pin 607' engaging the edge of opening 200a will hold lever 607 against counterclockwise movement. However, upon depression of setup key 468, a pin 468a on the key stem, which engages a cam surface on the left edge of latch arm 200, will rock said arm counterclockwise (Fig. 3), thereby removing shoulder 200b from engagement with plate 202. Latch arm 200 will, therefore, be permitted downward movement, and when crank 205 is rocked, links 203—204 will be effective to rock lever 607 and thereby lever 598. Upon conjoint depression of clear key 467 with setup key 468, the right carriage shift will be initiated and the setup operation effected upon termination of the carriage shift in accordance with said Patent #2,531,206. The slot at the end of the key stem of key 468 and opening 200a of latch arm 200 will permit lever 607 to be restored by links 203—204 if the key should be held depressed until the end of the clearout clutch cycle. Upon release of key 468, pin 468a, engaging a shoulder 200c adjacent the upper end of the cam edge of latch arm 200, will move the arm upwardly, thereby bringing shoulder 200b into latching engagement with plate 202.

As described in connection with the multiplier setup operation, pin 553a (Figs. 1 and 2) of spring energized lever 553 is operable through arm 776 to depress left shift key 370 if the carriage is out of its leftmost position. It will be obvious that the mechanism must be disabled for this operation if the carriage is out of its leftmost position and a right carriage shift is initiated in conjunction with a dividend entering operation. To this end, arm 777 is provided with a cam edge 777a. When lever 607 is rocked in the dividend entering operation, lug 607a thereof will engage cam edge 777a, thereby rocking arm 777 and arm 776 counterclockwise (Fig. 3). Therefore, when lever 553 is released, pin 553a will pass ineffectively to the right of arm 776.

Although the carriage position control means are herein shown and described in conjunction with specific clutch driven operations, it will be understood that the invention is equally applicable to the control of other clutch driven operations in machines of the class described. Also, it will be apparent that the drive for shifting the carriage and for effecting the controlled operations may be transmitted from the motor by separate clutches and power trains. It will be further understood, therefore, that the invention is not to be limited to use in machines employing the specific type of carriage shifting mechanism herein referred to, nor in which the power to drive the shifting mechanism and for effecting the particular operation performed is delivered through a common clutch mechanism.

I claim:

1. Operation control means for a motor driven calculating machine having a shiftable register carriage, mechanism for denominationally shifting said carriage, carriage shift control means for initiating and for terminating operation of said carriage shifting mechanism, a clutch mechanism, and a clutch control member movable to control the engagement of said clutch mechanism; said operation control means comprising the combination, of a normally spring energized mechanism, an operating member movable to initiate operation of said spring energized mechanism, and control devices adjustable in response to movement of said carriage into or out of a given position to control the operation of said spring energized mechanism respectively by direct power transmission to move said clutch control member to clutch engaging position, or to move said shift control means to initiate operation of said carriage shifting mechanism and sequentially to move said clutch control member to clutch engaging position.

2. Operation control means for a motor driven calculating machine having a shiftable register carriage, mechanism for denominationally shifting said carriage including a shift control member movable to initiate the operation, means operable upon movement of said carriage into a given position to terminate operation of said carriage shifting mechanism, a clutch mechanism, and a clutch control member movable to control the engagement of said clutch mechanism; said operation control means comprising the combination, of normally spring energized mechanism, an operating member movable to initiate operation of said spring energized mechanism, and control devices adjustable in response to movement of said carriage into said given position to control the operation of said spring energized mechanism by direct power transmission either to move said clutch control member to clutch engaging position, or in response to movement of said carriage out of said given position to move said shift control member to initiate operation of said carriage shifting mechanism to shift said carriage into said given position and thereupon to move said clutch control member to clutch engaging position.

3. Operation control means for a motor driven calculating machine having a shiftable register carriage, mechanism for denominationally shifting said carriage including a shift control member movable to initiate the operation, means operable upon movement of said carriage into a given position to terminate operation of said carriage shifting mechanism, a clutch mechanism, and a clutch control member movable to control the engagement of said clutch mechanism; said control means comprising the combination, of spring energized mechanism operable to move said clutch control member to clutch engaging position, an operating member movable to initiate operation of said spring energized mechanism, a restraining device adjustable into position to hold in abeyance the operation of said spring energized mechanism to move said clutch control member to clutch engaging position and thereupon operable by said spring energized mechanism to move said shift control member to shift initiating position, and a member operable upon movement of said carriage into or out of said shift terminating position to adjust said restraining device respectively out of or into restraining relationship with said spring energized mechanism.

4. Operation control means for a motor driven calculating machine having a shiftable register carriage, mechanism for denominationally shifting said carriage including a shift control member movable to initiate the operation, means operable upon movement of said carriage into a given position to terminate operation of said carriage shifting mechanism, a clutch mechanism, and a clutch control member movable to control the engagement of said clutch mechanism; said control means comprising the combination, of spring energized mechanism having a first and a second extent of movement and operable during said second extent of movement to move said clutch control member to clutch engaging position, an operating member movable to initiate operation of said spring energized mechanism, a restraining device adjustable into operating relationship with said spring energized mechanism; said device thereupon being operable by said spring energized mechanism during its first extent of movement to move said shift control member to shift initiating position and thereupon to restrain said spring energized mechanism from its second extent of movement, and a member operable upon movement of said carriage into or out of said shift terminating position to adjust said restraining device respectively out of or into operating relationship with said spring energized mechanism.

5. Operation control means for a motor driven calculating machine having a shiftable register carriage, mechanism for denominationally shifting said carriage including a shift control member movable to initiate the operation, a clutch mechanism, a clutch control member movable to control the engagement of said clutch mechanism, an auxiliary clutch, and means operable to control the engagement of said auxiliary clutch; said operation control means comprising the combination, of spring energized mechanism, a device adjustable to control the operation of said spring energized mechanism to move said shift control member to shift initiating position or alternatively said clutch control member to clutch engaging position, an operating member movable to initiate operation of said spring energized mechanism, a linkage operable by said auxiliary clutch to initiate operation of said spring energized mechanism, and an adjusting member operable by said auxiliary clutch to adjust said device to disable said spring energized mechanism to move said shift control member to shift engaging position.

6. Operation control means for a motor driven calculating machine having a shiftable register carriage, mechanism for denominationally shifting said carriage including a shift control member movable to initiate the operation, a clutch mechanism, a clutch control member movable to control the engagement of said clutch mechanism, an auxiliary clutch, and means operable to control the engagement of said auxiliary clutch; said operation control means comprising the combination, of spring energized mechanism, a device adjustable to control operation of said spring energized mechanism to move said shift control member to shift initiating position and said clutch control member to clutch engaging position sequentially, an operating member movable to initiate operation of said spring energized mechanism, a linkage operable by said auxiliary clutch to initiate operation of said spring energized mechanism, and an adjusting member operable by said auxiliary clutch to adjust said device to disable said spring energized mechanism to move said shift control member to shift engaging position.

References Cited in the file of this patent

UNITED STATES PATENTS

| Number | Name | Date |
|---|---|---|
| 2,294,948 | Avery | Sept. 8, 1942 |
| 2,572,920 | Gang | Oct. 30, 1951 |